June 8, 1937. F. O. BURGE 2,083,513
FISHING FLY AND METHOD OF PRODUCING SAME
Filed Oct. 18, 1935
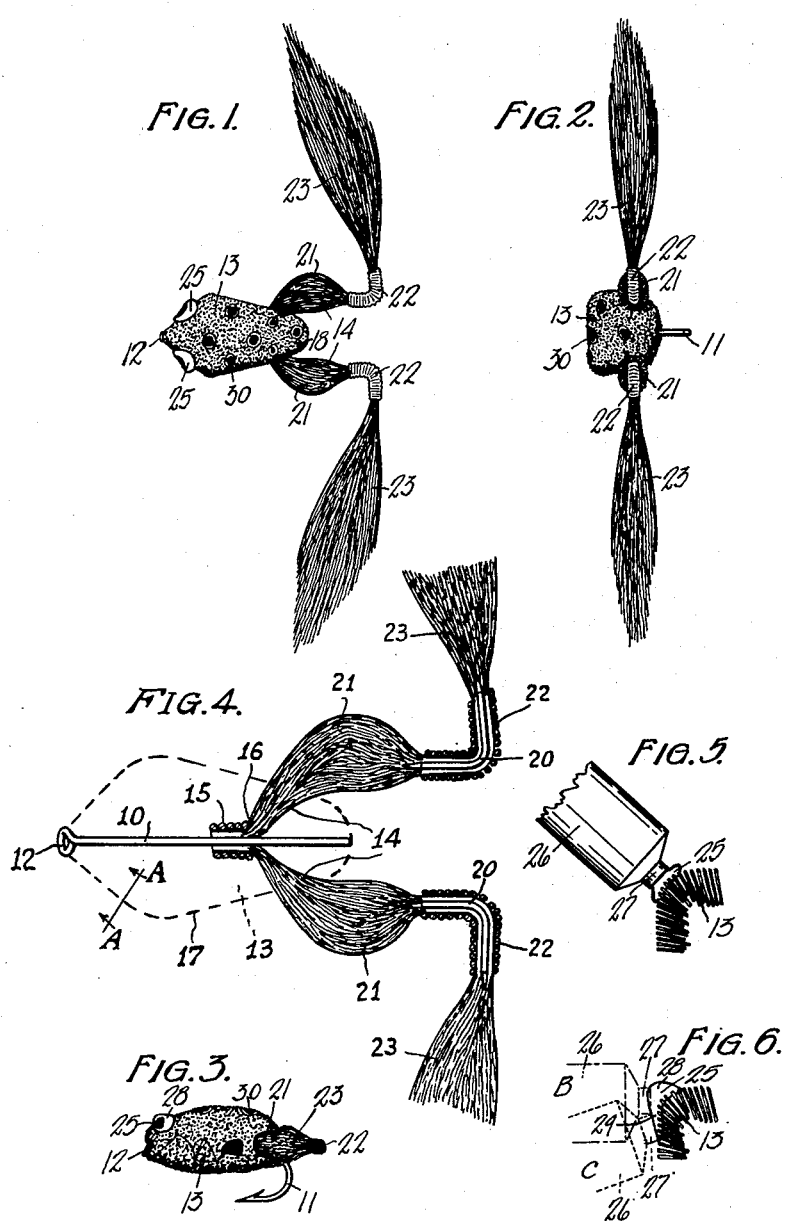
INVENTOR.
FLOYD O. BURGE.
BY Oltsch + Knoblock
ATTORNEYS.

Patented June 8, 1937

2,083,513

UNITED STATES PATENT OFFICE 2,083,513

FISHING FLY AND METHOD OF PRODUCING SAME

Floyd O. Burge, South Bend, Ind., assignor to South Bend Bait Company, South Bend, Ind.

Application October 18, 1935, Serial No. 45,537

15 Claims. (Cl. 43—48)

This invention relates to a fishing fly and method of producing same, and particularly to a fly formed of hair tied to a hook.

The primary object of the invention is to provide a fishing fly shaped to resemble a frog and provided with appendages shaped to resemble the flexed legs of a frog.

A further object is to provide a lure of this character formed of hair tied to a hook, in which strands or bunches of hair at opposite sides of and adjacent the rear of the lure project rearwardly outwardly and are fluffed to simulate the muscle and bent to simulate the joint of the leg of a frog.

A further object is to provide a lure of this character in which bunches of hair tied to the shank of a hook intermediate the length thereof extend rearwardly outwardly of the lure and are tied about a shaping member intermediate their length to hold the portion of each bunch adjacent the body portion fluffed and to permit bending of each bunch at the point of tie thereof.

A further object is to provide a novel, simple and inexpensive method of forming a frog-shaped lure.

A further object is to provide a novel eye for a fish lure.

A further object is to provide a novel, simple and inexpensive method of forming the eye of a fish lure.

Other objects will be apparent from the description and the appended claims.

In the drawing:

Figure 1 is a top plan view of the lure.

Figure 2 is a rear elevational view of the lure.

Figure 3 is a side view of the lure.

Figure 4 is a top view illustrating the formation of the leg appendages, with parts cut away.

Figure 5 is a fragmentary sectional view taken on line A—A of Fig. 4 and illustrating one step in the method of forming the eyes.

Figure 6 is a view similar to Fig. 5 illustrating the concluding steps in the method of forming the eyes.

Referring to the drawing, which illustrates the preferred embodiment of the invention, the numeral 10 designates the shank of a conventional fish hook from one of whose ends extends a return bent pointed end portion 11 preferably positioned below the shank, and from whose opposite end extends an eye 12 to which a fish line (not shown) may be secured.

The body 13 of the lure is formed of caribou or other suitable hair tied to the shank of the hook in the manner well understood in the art whereby the ties are all hidden from view by virtue of the positioning of the hair at each end of the body to extend outwardly from the tie. The hair of the body is trimmed into the desired shape, here illustrated as the body of a frog, so that the tips of the hairs outline the shape of the entire body, and the eye 12 and pointed end 11 of the hook project from the body. In trimming the hair, long rearwardly outwardly extending bunches or strands 14 of the hair are left uncut at each side of the body, the bunches 14 selected being ones preferably tied a substantial distance forwardly from the rearmost hair of the body, or substantially centrally of the hook shank. The tie for the bunches 14 is illustrated at 15 in Fig. 4, which illustrates the position at which the inner ends 16 of said bunches are tied on the hook shank relative to the over-all outline or outer surface of the lure body as illustrated in dotted lines 17 of said figure. The bunches 14 which project from the lure body as described are selected because they project from the lure body 13 in approximately the natural angular direction and at approximately the natural distance forwardly of the rear end portion 18 of lure body 13 that the legs of a live frog bear with relation to its body.

The strands 14 being ready for shaping, a rigid shaping member 20, preferably a short piece of wire, is inserted centrally between the hairs of the strand to extend longitudinally thereof and at an intermediate point of the projecting portion thereof. The portions 21 of the hairs of each strand between the body 13 and the member 20 are then fluffed, after which fluffing the hairs are tightly gripped while a thread 22 is wound around the same and the member 20 and tied thereto. The wound, wire-centered part of the leg strands 14 are then bent outwardly to simulate the bend of the joint of a flexed frog leg, whereby the outer portions 23 of said leg strands 14 extend oppositely and laterally outwardly relative to the hook shank and the lure body. In the fluffing of portions 21 of the hair strands, it will be noted that only the outer hairs thereof are loosely fluffed, and that the hairs at the inner side of said portions are substantially straight. This gives the portion 21 of the strands the appearance of the upper muscle of the leg of a frog, and additionally serves to draw the normally rearwardly angularly and outwardly extending hair of the strands to a position in which they extend substantially rearwardly from the sides of the body 13. After the thread wound intermediate portions of the strands have been bent, a protective coating of varnish or shellac is preferably applied thereto.

The eyes 25 of the lure are preferably formed of a viscous, non-soluble, plastic material having the consistency of a paste or putty when applied, whereby it will retain without substantial or detrimental running or flowing a shape in which it is formed. The material is also of a character which will set and harden in the shape in which it is formed when it is exposed to the atmosphere. I have found that a mixture of enamel and cellulose liquid cement possesses the desired characteristics, and additionally the necessary adhesive quality. In applying the plastic material I preferably use a collapsible tube 26 having the usual reduced dimension neck or mouth 27. A small quantity of the plastic material is first expelled from the mouth of the tube and is pressed against the body 13 at the point at which the eyes are to be formed, as illustrated in Fig. 5. The pressing of the plastic material against the body causes it to enter the interstices between the hairs for a short distance and to an extent sufficient to permit the same to firmly adhere to the outer ends of said hairs. The tube 26 is then angularly tilted and the mouth 27 thereof is slightly downwardly moved to the dotted line position B in Fig. 6, during which movement more of the plastic material is preferably expelled from the tube to provide the bulging upper part 28 of the eye. The tube 26 is then simultaneously angularly tilted and the mouth thereof downwardly and inwardly shifted to the dotted line position C of Fig. 6, without expelling any more of the plastic material, so that the lower part 29 of the eye is formed to taper smoothly downwardly and inwardly, and the plastic material is wiped flush from the mouth of the tube. Thus the tube mouth 27 from which the plastic material is fed serves additionally to shape or model the eye, which may thus easily be given that peculiar bulging shape or outline which is characteristic of a frog by a single simple manipulation of the tube.

To finish the lure, the pupil of the eye and the characteristic or decorative spots 30 on the body may be supplied by the application of paint.

It will thus be seen that by a comparatively few steps, a fish lure which has a marked similarity to a frog, particularly with respect to the positioning and shaping of the legs and eyes, is formed. Likewise, it will be obvious that the resistance of the water against the leg strands, when the lure is pulled through the water with a series of jerks, causes said legs to alternately move toward rearwardly extended position, and return to normal position, which movement closely simulates the leg movement of a frog while swimming.

I claim:

1. A fishing fly comprising a hook, hair tied to the shank of said hook and cut to simulate the shape of the body of a frog, a pair of oppositely disposed bunches of said hair spaced from the rear of said body projecting from said body in rearwardly diverging relation, a rigid substantially L-shaped member inserted centrally between the hairs of each bunch intermediate the length of the projecting part thereof, and a thread wound around and tied to said bunch and member whereby the outer portions of said bunches extend laterally outwardly from the remainder thereof.

2. A fishing fly comprising a hook, hair tied to the shank of said hook and cut to simulate the shape of the body of a frog, a pair of oppositely disposed bunches of said hair spaced from the rear of said body projecting from said body in rearwardly diverging relation, a substantially L-shaped wire inserted between the hairs of each bunch in spaced relation to said body, and a thread tied around said bunch and wire whereby the outer ends of said bunches extend laterally outwardly from the remainder thereof.

3. A fishing fly comprising a hook, hair tied to the shank of said hook and cut to simulate the shape of the body of a frog, a pair of oppositely disposed bunches of said hair spaced from the rear of said body projecting from said body in rearwardly diverging relation, a rigid substantially L-shaped member inserted between the hairs of each bunch in spaced relation to said body, and means for securing each of said bunches to said member whereby the outer ends of said bunches extend oppositely and laterally relative to said body.

4. A fishing fly comprising a hook, hair tied to the shank of said hook and cut to simulate the shape of the body of a frog, a pair of oppositely disposed bunches of said hair spaced from the rear of said body projecting from said body in rearwardly diverging relation, a rigid substantially L-shaped member inserted between the hairs of each bunch in spaced relation to said body, and means for securing said bunch to said member whereby the outer ends of each of said bunches extend oppositely and laterally relative to said body, the inner portion of each bunch being fluffed intermediate the body and securing means to simulate the shape of the muscle of the leg of a frog.

5. The combination with a fishing fly body comprising a hook and hair tied to the shank of said body, of a pair of bunches of hair tied to said hook shank intermediate the length of said shank and projecting laterally and rearwardly from said body, and a bent rigid member tied to the hairs of each bunch in spaced relation to said body whereby the outer ends of said bunches extend angularly from the inner portions thereof.

6. The combination with a fish lure body, of a bunch of hair extending rearwardly outwardly from one side of said body, and a rigid bent member secured to said bunch intermediate the length thereof and in spaced relation to said body whereby said bunch is bent into conformity with the bend of said member.

7. The combination with a fish lure body, of a bunch of hair projecting from one side of said body, and a rigid bent member secured to said bunch intermediate the length thereof whereby said bunch is bent into conformity with the bend of said member, the portion of said bunch intermediate said body and member being fluffed to simulate the muscle of the leg of a frog.

8. The method of forming a fishing fly consisting of the steps of tying hair to the shank of a hook, trimming all but a bunch of said hair on each side of said shank to a shape simulating the body of a frog, applying a rigid member to said bunch in spaced relation to said body portion, fluffing the portion of said bunch intermediate said body and said member, and tying a thread around said bunch and member, and bending said bunch and member.

9. The method of forming a fishing fly comprising the steps of tying hair to the shank of a hook, trimming all but a pair of opposed rearwardly extending bunches of said hair which are tied intermediate the length of said hook shank to a shape simulating the body of a frog, tying a shaping member to each bunch intermediate said body and the outer bunch ends, and bending said shaping members to shape said bunches.

10. The method of shaping a bunch of hair projecting from a fish lure body comprising the steps of applying a bendable substantially rigid member to said bunch intermediate the length thereof, fluffing the portion of said bunch between said body and member, tying a thread around said bunch and member, and bending said member and bunch.

11. The combination with a fishing lure formed of hair tied to a hook shank, of an eye formed of viscous, plastic material pressed between and adhering to the outer ends of said hair and shaped to project outwardly and upwardly of said hair at its upper end and tapering downwardly and inwardly from said upper end, said material hardening when exposed to atmosphere.

12. The combination with a fishing lure formed of hair tied to a hook shank, of an eye formed of viscous, plastic material which hardens when exposed to atmosphere, said material being pressed between and adhering to the outer ends of said hair and a configured portion thereof projecting outwardly of the hair.

13. The method of applying an eye to a fish lure body formed of hair, consisting of expelling from the mouth of a container and pressing into the interstices between the hair adjacent the surface of said body a mass of viscous, plastic material which hardens when exposed to atmosphere, and manipulating and moving the mouth of said container to smoothly shape the portion of said mass projecting from said body.

14. The combination with a fish lure body, of a bunch of hair extending rearwardly outwardly from one side of said body, and a substantially rigid bent member carried by said bunch in spaced relation to said body and cooperating with said bunch to bend the bunch into conformity with the bend thereof.

15. The combination with a fish lure body, of a bunch of hair projecting from said body, and a bent member secured to said bunch spaced from the ends thereof and in spaced relation to said body, whereby said bunch is bent into conformity with the bend of said member.

FLOYD O. BURGE.